(12) United States Patent
Ogino et al.

(10) Patent No.: US 7,031,942 B2
(45) Date of Patent: Apr. 18, 2006

(54) INFORMATION SIGNAL REPRODUCING APPARATUS, INFORMATION SIGNAL OUTPUTTING APPARATUS, INFORMATION SIGNAL REPRODUCING METHOD, AND INFORMATION SIGNAL OUTPUTTING METHOD

(75) Inventors: Akira Ogino, Tokyo (JP); Yuji Kimura, Kanagawa (JP); Tadashi Ezaki, Tokyo (JP); Teruhiko Kori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/328,241

(22) Filed: Jun. 8, 1999

(65) Prior Publication Data

US 2002/0156742 A1 Oct. 24, 2002

(30) Foreign Application Priority Data

Jun. 9, 1998 (JP) .................................. 10-160979

(51) Int. Cl.
*G06F 17/60* (2006.01)
(52) U.S. Cl. ...................................... 705/51
(58) Field of Classification Search ................. 705/51, 705/57; 386/68, 82, 94, 95; 380/203, 201, 380/202, 212
See application file for complete search history.

(56) References Cited

U.S. PATENT DOCUMENTS

| | | | | |
|---|---|---|---|---|
| 5,613,004 A | * | 3/1997 | Cooperman et al. .......... 705/51 |
| 5,892,900 A | * | 4/1999 | Ginter et al. ............... 713/200 |
| 6,236,727 B1 | * | 5/2001 | Ciacelli et al. ................. 380/5 |
| 6,282,654 B1 | * | 8/2001 | Ikeda et al. .................. 348/473 |
| 6,289,102 B1 | * | 9/2001 | Ueda et al. .................. 380/201 |
| 6,347,846 B1 | * | 2/2002 | Nakamura .................... 705/57 |
| 6,434,322 B1 | * | 8/2002 | Kimura et al. .............. 380/201 |

FOREIGN PATENT DOCUMENTS

EP 1 005 040 A1 * 5/2000

OTHER PUBLICATIONS

Aiken, John; How watermaking adds value to digital content; Jul. 1998; Communications of the ACM v41n7 pp 74-77; dialog copy pp. 1-4.*

* cited by examiner

*Primary Examiner*—Thomas A. Dixon
(74) *Attorney, Agent, or Firm*—Finnegan, Henderson Farabow, Garrett & Dunner, L.L.P.

(57) ABSTRACT

An information signal reproducing apparatus for reproducing an information signal from a recording medium on which the information signal, including added copy control information is recorded, comprising a first detector for detecting whether the information signal read out from said recording medium is encrypted or not-encrypted and for producing an output representative thereof; a second detector for detecting said copy control information from the information signal read out from the recording medium and for producing an output representative thereof; and a controller for selectively restricting reproduction of the information signal based on the outposts of the first detector and the second detector.

22 Claims, 8 Drawing Sheets

FIG. 2

| CGMS<br>ENCRYPTION | 1, 1 | 1, 0 | 0, 0 | 0, 1 |
|---|---|---|---|---|
| ENCRYPTED | ○ | × | × | — |
| NOT ENCRYPTED | × | ○ | ○ | — |

| ENCRYP-TION \ WM | Never Copy | One Copy | No More Copy | Copy Free |
|---|---|---|---|---|
| ENCRYPTED | ○ | × | X or O | × |
| NOT ENCRYPTED | × | ○ | ○ | ○ |

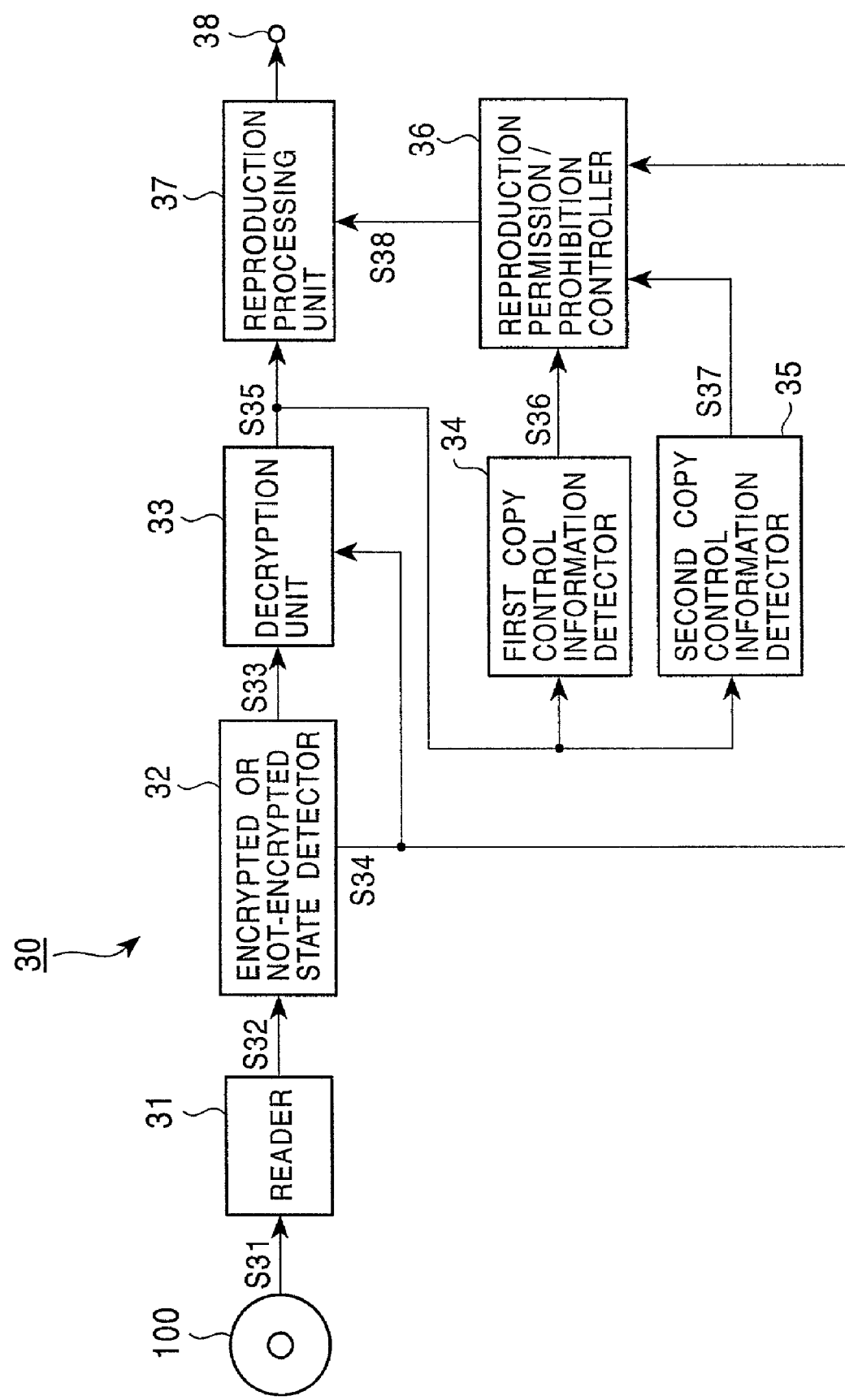

FIG. 8A

ENCRYPTED

| CGMS / WM | 1, 1 | 1, 0 | 0, 0 | 0, 1 |
|---|---|---|---|---|
| Never Copy | ○ | × | × | — |
| One Copy | × | × | × | — |
| No More Copy | × or ○ | × | × | — |
| Copy Free | × | × | × | — |

FIG. 8B

NOT ENCRYPTED

| CGMS / WM | 1, 1 | 1, 0 | 0, 0 | 0, 1 |
|---|---|---|---|---|
| Never Copy | × | × | × | — |
| One Copy | × | ○ | × | — |
| No More Copy | ○ | × | × | — |
| Copy Free | × | × | ○ | — |

PRIOR ART

INFORMATION SIGNAL REPRODUCING APPARATUS, INFORMATION SIGNAL OUTPUTTING APPARATUS, INFORMATION SIGNAL REPRODUCING METHOD, AND INFORMATION SIGNAL OUTPUTTING METHOD

BACKGROUND OF THE INVENTION

1. Field of the Invention

The present invention relates to a technique intended to prevent illegal copying of information signals supplied, for example, from recording media or via networks.

2. Description of the Related Art

With increased commercialization of VTRs (Video Tape Recorders), digital VTRs, and reproducing or recording/reproducing apparatus for DVDs (Digital Video Discs), a large amount of software capable of being reproduced by those apparatus have been provided. Also, with the expanding use of networks such as the Internet, users can also obtain a variety of software via these networks.

On the other hand, there is a concern that marketed software may be copied without limitations, thus allowing users to steal the software. To cope with this problem, it has been proposed to add copy control information to main information signals such as video signals. This copy control information includes, e.g., prohibition of copy, permission of copy, or limitation of copy generation. Copy control is performed in accordance with the added copy control information. In the case where main information signals are digital signals and are supplied from discs such as DVDs or via networks, additive information such as copy control information is recorded in an area spatially distinct from the main digital information signals, for example, in a header included for each block of the digital information signals. Also, where main information signals are analog video signals, an additive information signal, such as copy control information, is superimposed in an unused horizontal zone within a vertical blanking period of the analog video signals so that the analog video signals will not be affected.

A recording apparatus for receiving main information signals such as analog video signals and recording the received signals on a recording medium is constructed, by way of example, as shown in FIG. 10. The recording apparatus includes a copy control information detector 53 and a copy permission/prohibition controller 54. Copy control information detector 53 extracts copy control information that was added to the supplied information signals as mentioned above. Based on the copy control information extracted by copy control information detector 53, copy permission/prohibition controller 54 controls a writer 52 to write permission or prohibition signals when recording the main information signals.

As described above, copy control information is added to an indirect portion, e.g., a header of digital information signals or an unused horizontal zone within a vertical blanking period of the analog video signals. Therefore, the copy control information is relatively easily removed from the signal by filtering or tampering with the signal, resulting in disabling the copy control.

Main information signals, once illegally copied after the copy control information has been tampered with, can be freely reproduced and output after this illegal copying. In other words, the main information signals thus output can be further illegally copied over and over again on additional recording media. The illegal copying can therefore be repeated without limitation. Users or purchasers of illegal copies cannot discern whether main information signals such as video signals have been illegally copied. Accordingly, even if main information signals have been illegally copied, complaints are not voiced to dealers who are illegally copying and selling the information signals, because the users suffer from no disadvantages so long as they can utilize the copied information signals without problems. Such a situation has been one of the reasons that illegal copying of information signals has continued.

OBJECTS OF THE INVENTION

In view of the state of art set forth above, it is an object of the invention to provide an improved technique which can prevent illegal copying of information signals and avoid circulation of illegally copied information signals by restricting reproduction and output of the illegally copied information signals.

A further object of the invention is to provide an improved technique that adequately controls the reproduction of recorded or transmitted signals.

Still other objects and advantages of the invention will in part be obvious and will in part be apparent from the specification and the drawings.

SUMMARY OF THE INVENTION

Generally speaking, in accordance with the invention, there is provided an information signal reproducing apparatus for reproducing an information signal from a recording medium on which an encrypted information signal having copy control information added thereto is recorded. The apparatus includes an encrypted or not-encrypted state detector for detecting whether the information signal read out of the recording medium is encrypted or not, a copy control information detector for detecting copy control information from the information signal read out from the recording medium, and a reproduction restriction controller for restricting reproduction of the information signal based on the outputs of the encrypted or not-encrypted state detector and the copy control information detector.

The reproduction restriction control means determines whether the combination of encryption (or not-encryption) of the information signal and the copy control information is one of the combinations which should not occur in normal use. If so, reproduction of the information signal is prevented. For example, if the information signal is illegally copied with improper decryption of the encrypted information signal or the copy control information has been tampered with, the combination of encryption (or not-encryption) of the information signal and the copy control information will be one of the combinations which should not occur in normal use. When such a combination is detected, the reproduction restriction control means determines that the information signal was illegally copied, and restricts reproduction of that information signal.

Because reproduction of the illegally copied information signal is restricted, illegal copying of the information signal is prevented from being repeated. Also, restricting reproduction of the information signal informs users themselves that the information signal was illegally copied. Therefore, users who attempt to utilize the information signal but cannot because its reproduction is restricted can raise complaints against the dealers who supplied the illegally copied information signal. This makes it possible to more easily control dealers who are supplying illegally recorded information signals. As a result, illegal copying of information signals can be prevented or at least minimized.

According to a second aspect of the invention, in the information signal reproducing apparatus, a plurality of different kinds of copy control information are added to the information signal. A plurality of copy control information detectors corresponding to the plural different kinds of copy control information are provided, and reproduction restriction of the information signal is based on the output of the encrypted or not-encrypted state detector and the respective outputs of the plurality of copy control information detectors. If the information signal has been illegally copied and one of the different kinds of copy control information has been tampered with, the type of copy control represented by that copy control information is taken into consideration in determining that the information signal was illegally copied. As a result, the illegal copying of the information signal to be reproduced can be reliably determined and reproduction of the illegally copied information signal can be surely and properly restricted.

According to another aspect of the invention, in the information signal reproducing apparatus, copy control information in accordance with the copy generation management system (CGMS) is added to the information signal, and the CGMS copy control information is detected by the copy control information detector. Rather than simply permitting or prohibiting reproduction of the information signal, the CGMS copy control information can represent whether copying is prohibited, whether one copy can be made, or whether copying may be unrestricted. Therefore, if the information signal has been illegally copied with improper decryption of the encrypted information signal or with tampering of the CGMS copy control information, illegal copying of the information signal can be reliably determined based on the combination of the encryption (or not-encryption) of the information signal and the content of the CGMS copy control information.

According to a further aspect of the invention, electronic watermark information is embedded as the copy control information in the information signal and is detected by the copy control information detector. The electronic watermark information is embedded as noise in a portion of the information signal, which is not important from the viewpoint of human perception. An electronic watermark is hard to remove and hence it is robust against illegal tampering. On the other hand, even after the information signal has been subjected to filtering or data compression, the electronic watermark is still present and can be properly read. Further, the electronic watermark information can represent whether copying is prohibited, whether one copy can be made, whether no additional copies can be made, or whether copying may be unrestricted.

Therefore, if the information signal is illegally copied with improper decryption of the encrypted information signal or with tampering of the electronic watermark information, illegal copying of the information signal can be reliably determined based on the combination of the encryption (or not-encryption) of the information signal and the content of the electronic watermark information.

According to yet another aspect of the invention, the information signal is encrypted by a contents scramble system (CSS), and this is detected by the encrypted or not-encrypted state detector. Reproduction restriction is based on the combination of CSS encryption (or not-encryption) of the information signal and the copy control information.

The invention accordingly comprises the several steps and the relation of one or more of such steps with respect to each of the others, and the apparatus embodying features construction, combinations of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following descriptions and accompanying drawings, in which:

FIG. 2 is a table depicting combinations between encryption or not-encryption of a video signal component and the contents of copy control information in accordance with the CGMS (Copy Generation Management System);

FIG. 7 is a block diagram depicting reproducing apparatus according to another embodiment of the invention;

FIGS. 8A and 8B are tables depicting combinations of CGMS copy control information and SS copy control information, depending on encryption or not-encryption of a video signal component;

DETAILED DESCRIPTION OF THE PREFERRED EMBODIMENTS

Figure 1:
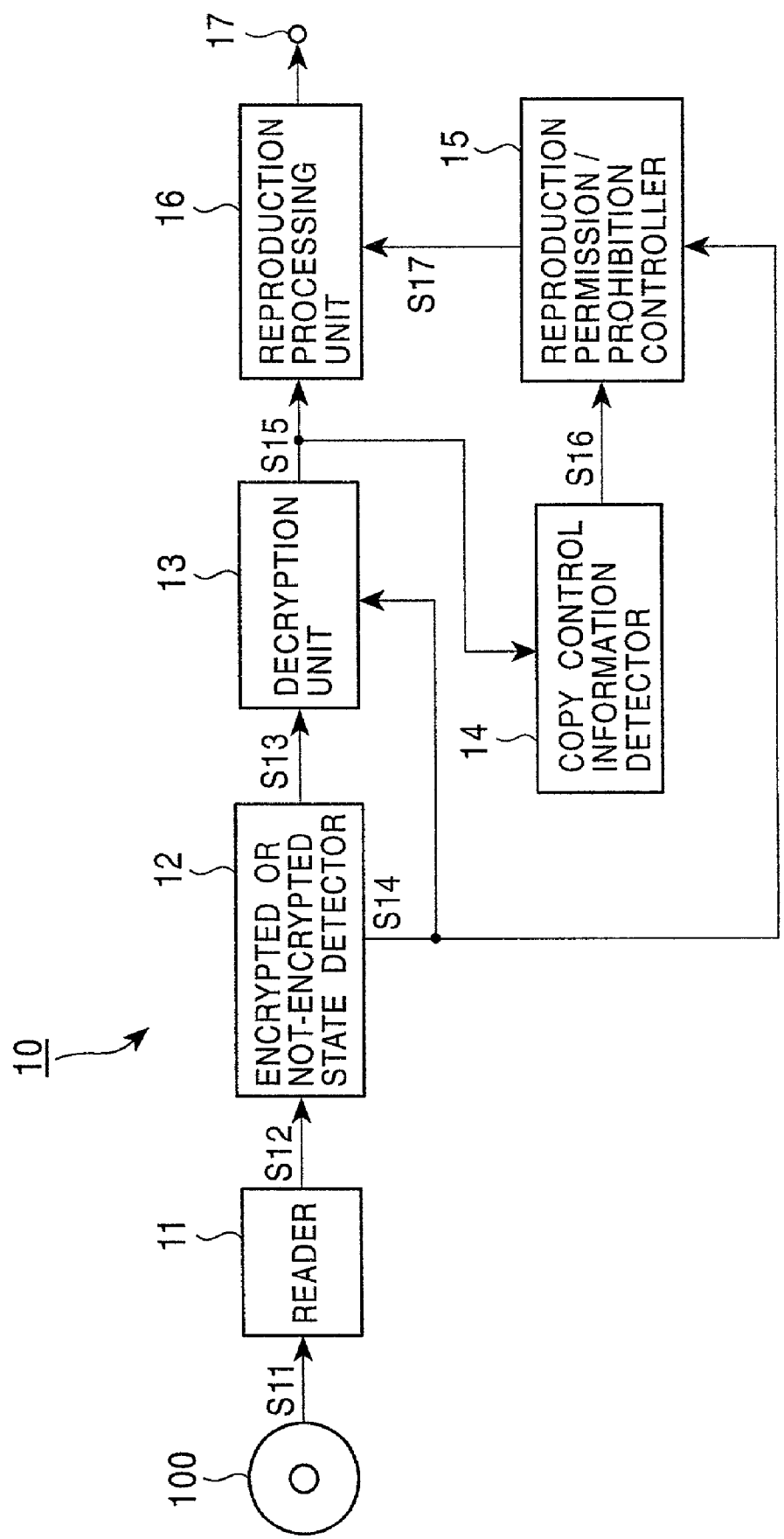
FIG. 1 is a block diagram depicting a first embodiment of an information signal reproducing apparatus according to the invention.

FIG. 1 is a block diagram depicting an information signal reproducing apparatus (hereinafter referred to simply as a reproducing apparatus) 10 constructed in accordance with a first embodiment of the invention. The reproducing apparatus 10 shown in FIG. 1 is for playing back a digital video disc (DVD) (hereinafter referred to simply as a disc). Reproducing apparatus 10 can reproduce video signals or voice signals recorded on a disc 100, and supply the reproduced signals to a monitor receiver or the like. A system for reproducing video signals will be described for example only. A system for reproducing voice or other signals may also employ the invention.

In this first embodiment, reproducing apparatus 10 is intended to reproduce only video signals recorded on discs which have not been illegally produced. More specifically, for the purpose of preventing illegal copying of video signals, when dealers who are qualified to produce discs and supply them record video signals on discs, CGMS (Copy Generation Management System) copy control information is added to the video signals. Additionally, the video signals for which copying is to be prohibited are encrypted in accordance with the CSS (Contents Scramble System). The information is then recorded on the discs.

Reproducing apparatus 10 of this first embodiment is designed to prohibit reproduction when a combination of the CSS encryption (or not-encryption) of video signals to be reproduced and the contents of the copy control information in accordance with the CGMS is one of the combinations that should not occur in normal use. These improper combinations may be present for reasons such as improper decryption of the encrypted video signals or tampering with the copy control information added to the video signals. The video signals are determined to be illegally copied, and reproduction of the video signals is prohibited, or normal reproduction thereof is disabled.

Prior to describing the reproducing apparatus 10 of this first embodiment, the CSS encryption process applied to video signals to be recorded on discs and the CGMS copy control information added to the video signals will be described.

The CSS encryption process is an encryption process aiming at protection of copyright. According to this encryption process, information signals such as video signals are encrypted by combining three encryption key data, i.e., master key data, disc key data, and title key data.

The master key data is built into an approved reproducing apparatus in such a manner as to prevent this master key data from being easily discovered. Also, the disc key data and the title key data are written onto discs along with encrypted video signals upon production thereof. The disc key data and the title key data are written in such a manner that they are not output from the reproducing apparatus when the video signals are reproduced therefrom.

By carrying out the encryption process in this manner, the video signals can be reproduced by only those reproducing apparatus which are adapted for the CSS encryption process and include the proper master key data. When video signals have been so encrypted and are copied from a legally produced disc to any other recording medium, if users attempt to reproduce the video signals copied on the other recording medium, decryption cannot be performed because of the absence of the disc key data and the title key data. Thus, the encrypted video signals cannot be normally reproduced. The CSS encryption process is therefore designed to prevent the illegal use or reproduction of video signals which are recorded on legally produced discs.

CGMS copy control information is made up of two bits and is added to an area spatially distinct from the video signals recorded on discs, for example, in a header added to data blocks of the digital video signals. The CGMS copy control information is then recorded on the discs along with the video signals.

The CGMS copy control information represent three states below;

(1) (1, 1) state (Never Copy) where copying is always prohibited,
(2) (1, 0) state (One Copy) where only one single generation copy is allowed, and
(3) (0, 0) state (Copy Free) where copying is always allowed freely.

The CGMS copy control information represents the copy permission state of video signals. This system controls copying depending on each of the states represented by the CGMS copy control information.

When the CGMS copy control information is (1, 0) and video signals are copied, the copy control information is rewritten to (1, 1) before being recorded on a recording medium and in accordance therewith, and the video signals are encrypted by the procedure as noted above. As a result, the copy control information added to the copied video signals represent the copy prohibited state, and subsequent copying is prohibited. A state (0,1) is not employed in the CGMS copy control information at the present. This state is reserved for future use.

In accordance with this embodiment, video signals are recorded on legally produced discs after being encrypted by the CSS encryption process (hereinafter referred to simply as the encryption process) and after having the CGMS copy control information added thereto. The following combinations between encryption and copy control are used. For video signals for which copying is always prohibited, the video signals are encrypted and copy control information (1, 1) representing the copy prohibited state is added to the video signals before being recorded on a disc. For video signals for which only one single generation copy is allowed, the video signals are not encrypted, and copy control information (1, 0) representing the only-one-generation copy allowed state is added to the video signals before being recorded on a disc. For video signals for which copying is not restricted, but allowed freely, the video signals are not encrypted and copy control information (0, 0) representing the copy allowed state is added to the video signals before being recorded on a disc.

Next, reproducing apparatus 10 of this first embodiment for reproducing the video signals recorded on discs that were legally produced will be described. As shown in FIG. 1, reproducing apparatus 10 of this first embodiment comprises a reader 11 for reading video signals, an encrypted or not-encrypted state detector 12, a decryption unit 13, a copy control information detector 14, a reproduction permission/prohibition controller 15, a reproduction processing unit 16, and an output terminal 17 for outputting reproduced video signals.

Reader 11 forms digital reproduced signals S12 from signals S11 generated by reproducing information recorded on a recording medium 100. The digital reproduced signals S12 include, in addition to a video signal component, flag information indicating whether the video signal component is encrypted, and cryptographic information such as block key data and title key used when the video signal component is encrypted. The digital reproduced signals S12 are supplied to encrypted or not-encrypted state detector 12.

Encrypted or not-encrypted state detector 12 supplies the digital reproduced signals S12, as digital reproduced signals S13, to decryption unit 13. Encrypted or not-encrypted state detector 12 detects the flag information indicating whether the video signal component to be reproduced is encrypted and thus determines whether the video signal component is in an encrypted or not-encrypted state. The detection output is supplied as a signal S14 to decryption unit 13 and reproduction permission/prohibition controller 15.

When it is determined that the video signal component contained in the digital reproduced signals S13 is encrypted based upon detection output S14, decryption unit 13 decrypts the encrypted video signal component using the master key data stored in decryption unit 13 and the disc key data and the title key data both contained in the digital reproduced signal S13. A decrypted video signal component S15 is thereafter supplied to copy control information detector 14 and reproduction processing unit 16.

If it is determined that the video signal component contained in the digital reproduced signal S13 is not encrypted, decryption unit 13 extracts the video signal component from the digital reproduced signal S13, and supplies the extracted video signal component, as video signal component S15, to copy control information detector 14 and reproduction processing unit 16.

Copy control information detector 14 detects two-bit copy control information that has been added to video signal component S15, and supplies a detection output S16 to reproduction permission/prohibition controller 15. Based on the detection output S14 from encrypted or not-encrypted state detector 12 and the detection output S16 from copy control information detector 14, reproduction permission/prohibition controller 15 produces a control signal S17 indicative of whether the video signal can be reproduced. This control signal is supplied to reproduction processing unit 16, thereby controlling reproduction processing unit 16.

More specifically, when a combination between encryption (or not-encryption) of the video signal component to be reproduced and the copy control information is one of the combinations which should not occur in normal use, reproduction permission/prohibition controller 15 determines that the video signal component has been illegally copied. Reproduction processing unit 16 is thus controlled not to reproduce the video signal component.

FIG. 2 is a table depicting combinations between encryption or not-encryption of the video signal component to be reproduced and the CGMS copy control information. In FIG. 2, a crossed mark X indicates that the combination between encryption or not-encryption of the video signal component to be reproduced and the copy control information should not occur in normal use, while a white circle O indicates that the combination therebetween may occur in normal use. As shown in FIG. 2, when the video signal component to be reproduced is encrypted, this means that copying of the video signals is prohibited. Hence, if the copy control information is in a state other than the copy prohibited (1, 1) state, it can be determined that the information was illegally copied and the copy control information was tampered with. Accordingly, as shown FIG. 2, when the video signal component is encrypted and the copy control information represents the copy prohibited (1, 1) state, the video signal component is determined to be in a normal condition. Reproduction permission/prohibition controller 15 then controls reproduction processing unit 16 to reproduce the video signals. The reproduced video signals are supplied to a monitor receiver or the like via output terminal 17.

On the contrary, when the copy control information indicates the only-one-generation copy allowed (1, 0) state or the copy allowed unrestricted (0, 0) state and the video signal component is encrypted, it is determined that the video signals were illegally copied, including tampering with the copy control information. Reproduction permission/prohibition controller then controls reproduction processing unit 16 to not reproduce video signals.

Also, for video signals that are not encrypted, copying of the video signals is not prohibited. As shown in FIG. 2, therefore, it can be determined that if the copy control information is in the only-one-generation copy allowed (1, 0) state or the copy allowed unrestricted (0, 0) state, the video signals have been legally reproduced. If the copy control information is in the copy prohibited (1, 1) state and the video signal is not encrypted, this implies that the video signal was illegally decrypted, or the copy control information was tampered with, and that the video signals were illegally copied. Accordingly, as shown FIG. 2, when the video signal component is not encrypted and includes copy control information representing the only-one-generation copy allowed (1, 0) state or the copy allowed (0, 0) state, that video signal component is determined to be in a normal condition. Reproduction permission/prohibition controller 15 then controls reproduction processing unit 16 to reproduce the video signals. On the contrary, when the copy control information is in the copy prohibited (1, 1) state and the video signal component is not encrypted, it is determined that the video signals recorded on the disc 100 were illegally copied. Reproduction permission/prohibition controller 15 then controls reproduction processing unit 16 to not reproduce the video signals.

Alternatively, when it is determined that the video signals to be reproduced were illegally copied, reproduction permission/prohibition controller 15 may perform control in such a way as, for example, allowing reproduction of the video signals while also displaying an attention message informing users of that the reproduced video signals were illegally copied, or blanking a part of the reproduced image so that users cannot see the whole of the reproduced image in a normal condition. With such control of the reproduction process, it is possible to notify users in a more positive manner of the fact that the video signals were illegally copied. Thus, reproduction permission/prohibition controller 15 in this first embodiment can not only control reproduction processing unit 16 for simply permitting or prohibiting reproduction of the video signals, but also restrict the reproduction in some manner.

Additionally, because the copy control information (0, 1) is not employed at the present, the reproducing apparatus can determine that if the copy control information is in the (0, 1) state, reproduction of the video signals is prohibited because the copy control information was tampered with. Because the copy control information (0, 1) state may be employed in the future, it is preferable that a processing circuit of reproducing apparatus 10 allows for the updating of the chart shown in FIG. 2 accordingly.

As described above, when the combination between encryption or not-encryption of video signals to be reproduced and the contents of copy control represented by the copy control information is one of the combinations which should not occur in normal use, it is determined that the video signals were illegally copied. Then, by prohibiting reproduction of the illegally copied video signals, repetition of illegal copying can be prevented.

Also, when users attempt to reproduce the illegally copied video signals, reproduction of those video signals is prohibited, or an image is not reproduced in a normal condition, whereby illegal copying of the video signals can be further prevented. The users are thus informed that the video signals were illegally copied. The users can thus raise complaints against the dealers who have sold the illegal copies. This enables easier control over the dealers who are marketing the illegal copies. It is hence possible to prevent illegal copying of video signals and to avoid circulation of recording media including illegally copied video signals.

While in the embodiment described above, CGMS copy control information is added to video signals, electronic watermark information may be alternatively used. In this case, the electronic watermark information used as the copy control information is embedded in the video signals by electronic watermark processing.

Electronic watermark processing includes a process of embedding information as noise in a portion of image data or music data which is not important from the viewpoint of human perception. Embedded electronic watermark information is hard to remove and is hence robust against illegal tampering. Additionally, even after image data or music data including an electronic watermark has been filtered or the data has been compressed, the copy control information embedded by the electronic watermark can still be read. Therefore copy control can be performed more reliably by utilizing watermarked copy control information.

When dealers who are qualified to legally produce and supply discs including video signals recorded thereon, copy control information is first subjected to spectrum spreading, i.e., electronic watermark processing, to be formed into a signal having a wide band and a very low level. Then this information is embedded in the video signals that are to be recorded on the discs. Additionally, when copying of the video signals to be recorded on the discs is prohibited, those video signals are encrypted after the watermark information is embedded in accordance with CSS.

The copy control information is represented by two bits, for example, and includes the four states below:
(1) "copy prohibited (Never Copy)",
(2) "only one generation copy allowed (One Copy)",
(3) "more copy prohibited (No More Copy)", and
(4) "copy allowed freely (Copy Free)".

Thus, the copy control information represents the copy permission state of video signals in which the copy control information is embedded. By detecting the copy control information, copy control can be performed depending on the state of the detected copy control information similar to the above-described case employing CGMS copy control information.

Figure 3:
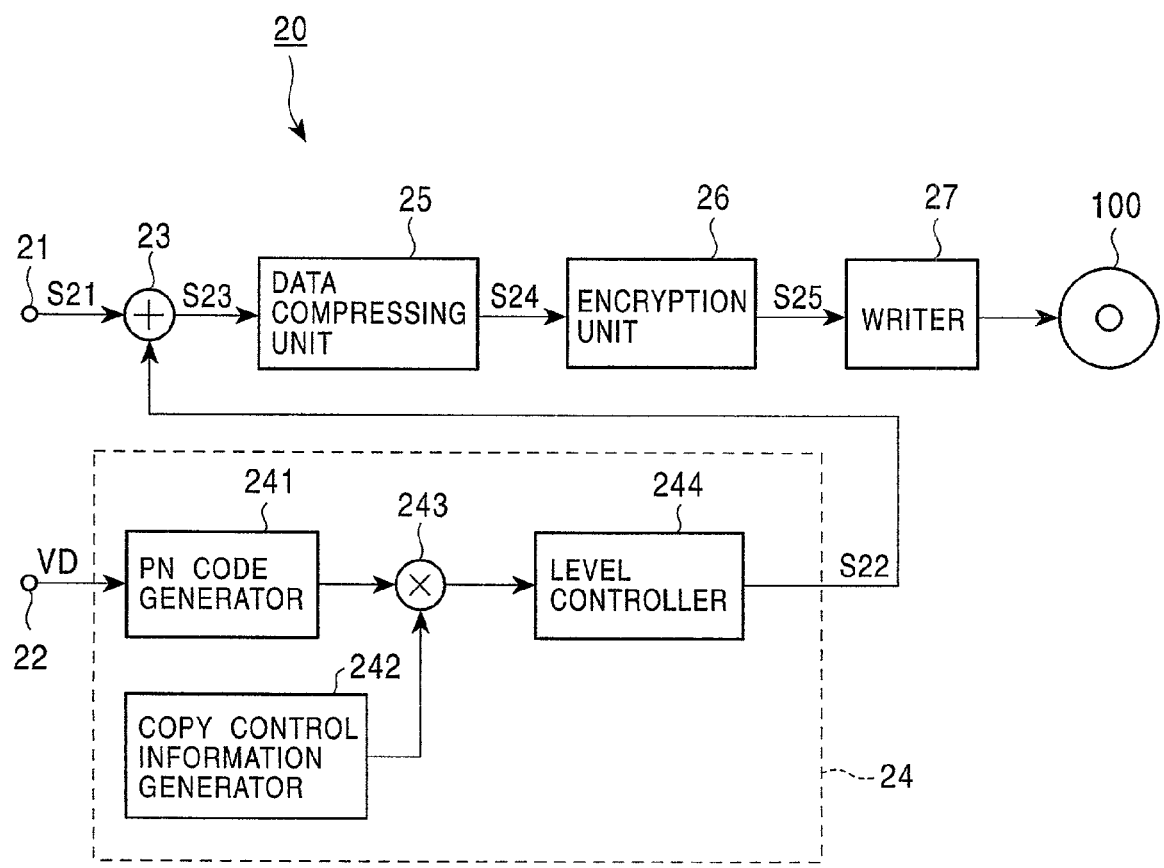
FIG. 3 is a block diagram depicting recording apparatus for recording video signals on a recording medium while copy control information obtained through spectrum spreading (SS) is embedded as electronic watermark information in the video signals.

FIG. 3 is a block diagram depicting a recording apparatus 20 for recording video signals. Recording apparatus 20 is employed to produce discs by recording the video signals while applying CSS encryption to the video signals and adding electronic watermark information as copy control information. A similar recording apparatus would be used to record video signals in the first embodiment that are reproduced by the apparatus of FIG. 1, the copy protection information being added by CGMS rather than watermark generation.

As shown in FIG. 3, recording apparatus 20 comprises an input terminal 21 for receiving digital video signals, an input terminal 22 for receiving a vertical synch signal VD used as a timing signal, an adder 23, an SS copy control information generator 24 for generating copy control information subjected to spectrum spreading (hereinafter referred to as SS copy control information; SS denotes spectrum spreading), a data compressing unit 25, an encryption unit 26, and a writer 27. Also, the SS copy control information generator 24 comprises a PN code generator 241, a copy control information generator 242, a multiplier 243, and a level controller 244.

Digital video signals S21 to be recorded on a disc 100 are supplied to adder 23 through input terminal 21. Also, a vertical synch signal VD for the digital video signals S21 is supplied through input terminal 22. Vertical synch signal VD is also supplied to both PN code generator 241 and copy control information generator 242. Here, vertical synch signal VD is employed as a timing signal based on which a spreading code for use in spectrum spreading of the copy control information is generated.

By using a clock signal in synch with the vertical synch signal VD, PN code generator 241 generates a PN (Pseudorandom Noise) code string that is used as a spreading code employed for spectrum spreading of the copy control information. By using a clock signal in synch with the vertical synch signal VD similarly to PN code generator 241, copy control information generator 242 generates a copy control information string that is to be embedded in the video signals at the synchronous timing with the vertical synch signal VD. PN code string from PN code generator 241 and copy control information string from copy control information generator 242 are both supplied to multiplier 243.

Multiplier 243 carries out spectrum spreading of the copy control information string by multiplication by the PN code string, thereby forming the SS copy control information that is then supplied to level controller 244. Level controller 244 adjusts the SS copy control information to a very low level so that when the video signals having the SS copy control information embedded therein are supplied to a monitor receiver to display an image, the embedded SS copy control information will not disturb the displayed image. SS copy control information S22 having this adjusted level is supplied to adder 23.

Adder 23 embeds the SS copy control information S22 in the digital video signals S21 to form digital video signals S23. The digital video signals S23 are then supplied lo data compressing unit 25. Data compressing unit 25 data-compresses the digital video signals supplied thereto in accordance with the MPEG system, for example, and supplies data-compressed digital video signals S24 to encryption unit 26.

When the digital video signals S24 are to be prohibited from being copied, encryption unit 26 applies CSS encryption to the digital video signals S24 in a similar manner as described above, and forms encrypted digital video signals S25 which are then supplied to writer 27. When the digital video signals S24 are not to be prohibited from being copied, encryption unit 26 does not encrypt the digital video signals S24 and supplies the not-encrypted digital video signals S25 to writer 27. When the digital video signals S25 are supplied, writer 27 records various pieces of necessary information, including disc key data and title key data, on disc 100 along with the supplied digital video signals. As a result, recorded on disc 100 are digital video signals in which the SS copy control information (electronic watermark information) is embedded and which have been subjected to the CSS encryption process when the digital video signals are to be prohibited from copying.

Figure 4A:
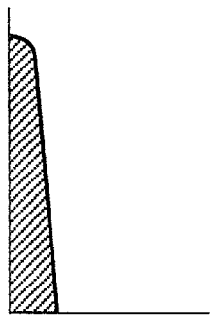
FIGS. 4A to 4D are graphs depicting the relationship between information signals and SS copy control information embedded in the information signals.
Figure 4B:
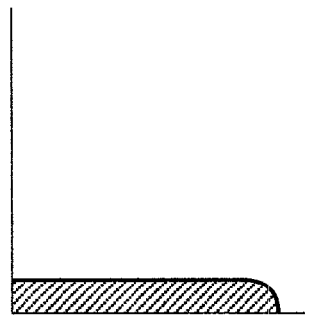

FIGS. 4A to 4D illustrate, in the form of a spectrum, the relationship between the SS copy control information that is embedded in the video signals, and the video signals. The copy control information contains a small amount of information, and is produced as a signal having a low bit rate and a narrow band as shown in FIG. 4A. When such a signal is subjected to spectrum spreading, a wide-band signal shown in FIG. 4B is obtained. A level of the spectrum spread signal is lowered in inverse proportion to a spreading ratio of the band.

Figure 4C:
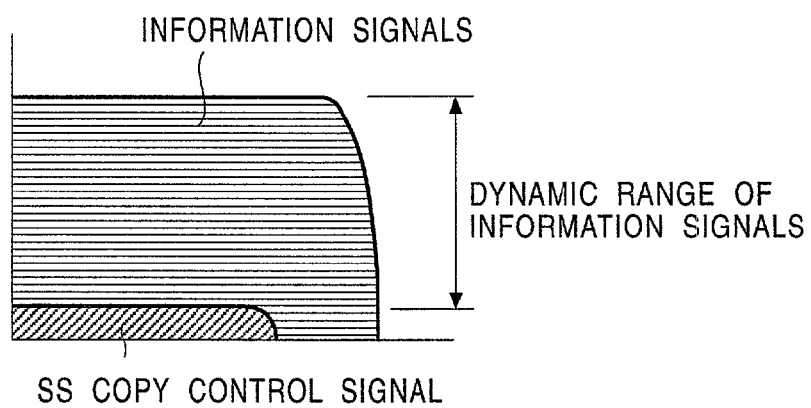

The thus-obtained spectrum spread signal is, as described above, embedded in the digital video signals S21 in adder 23. As shown in FIG. 4C, the spread spectrum signals are embedded at a lower level than the dynamic range of the video signals. By embedding the spread spectrum signals in such a manner, deterioration of the video signals can be substantially avoided. Accordingly, when the video signals including the SS copy control information embedded therein are supplied to the monitor receiver and a picture is reproduced, the SS copy control information does not substantially influence the picture and a good reproduced picture is obtained.

Figure 4D:
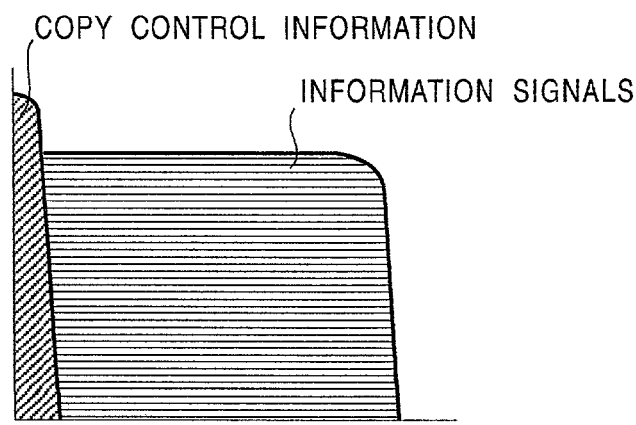

When the spread spectrum signal is subjected to spectrum de-spreading to detect the embedded SS copy control information, the SS copy control information is restored to a narrow-band signal, as shown in FIG. 4D. By selecting a sufficient rate of band spreading, the power level of the copy control information after the de-spreading exceeds that of the video signals so that the copy control information can be easily detected.

Because the copy control information is embedded in the video signals within the same time period and the same frequency range as the actual pictures, it is nearly impossible to delete or modify the embedded copy control information by a frequency filter or simple replacement of information. Accordingly, the copy control information can be insured of being transmitted together with the video signals. In addition, by embedding the copy control information at a signal power level lower than that of the video signals, deterioration of the video signals can be minimized. Furthermore, such embedded copy control information is hard to tamper with or remove, thus making it harder to illegally copy these video signals.

For video signals that are to be prohibited from being copied after being legally recorded on discs using recording apparatus 20 shown in FIG. 3, the SS copy control information (the electronic watermark information) is embedded in those video signals, and the signals are encrypted before being recorded on the discs. Therefore, the reproducing apparatus for reproducing video signals can control reproduction based on combinations of the encryption (or not-encryption) of the video signals and the SS copy control information at the time of reproducing the video signals, and can thus prevent the use of illegally copied video signals. The use of illegally copied video signals can be prevented by using a reproducing apparatus similar to reproducing apparatus 10 described above in to FIG. 1. In a reproducing apparatus for reproducing video signals including SS copy control information, components other than copy control information detector 14 are constructed similarly to those in reproducing apparatus 10 of FIG. 1. Copy control information detector 114 for detecting SS copy control information, constructed as shown in FIG. 5, is employed in place of copy control information detector 14.

Figures 5, 6:
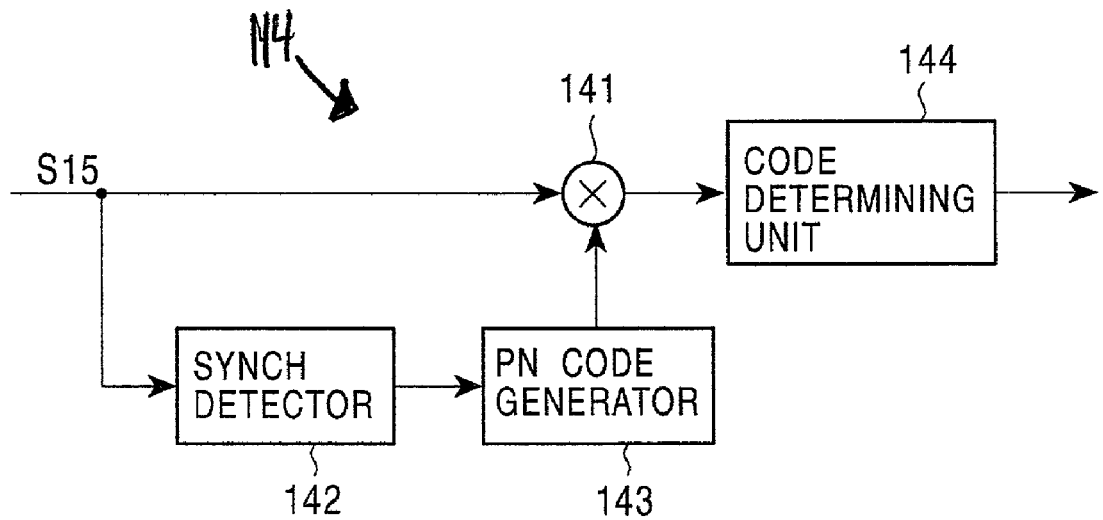
FIG. 5 is a block diagram depicting a copy control information detector for detecting the SS copy control information.
FIG. 6 is a table depicting combinations between encryption or not-encryption of a video signal component and the SS copy control information.

FIG. 5 is a block diagram for explaining copy control information detector 114 for detecting SS copy control information. As shown in FIG. 5, copy control information detector 114 comprises a multiplier 141, a synch detector 142, a PN code detector 143, and a code detector 144. The SS copy control information embedded in digital video signals is detected through spectrum de-spreading by copy control information detector 114.

As with reproducing apparatus 10 described above with reference to FIG. 1, the video signal component S15 from decryption unit 13 is supplied to copy control information detector 114. The video signal component S15 is, as described above, a video signal component decrypted by decryption unit 13 when the digital video signals are encrypted, or a digital signal component extracted from the digital video signals S13 by decryption unit 13 without being decrypted when the digital video signals are not encrypted. The video signal component S15 from decryption unit 13 is supplied to reproduction processing unit 16, and at the same time supplied to multiplier 141 and synch detector 142 of copy control information detector 114. Synch detector 142 detects the vertical synch signal VD from video signal component S15, and supplies the detected vertical synch signal VD to PN code generator 143.

In a like manner to the case of generating a PN code string used for the spectrum spreading in recording apparatus 20 shown in FIG. 3, by using a clock signal in synch with the vertical synch signal VD, PN code generator 143 generates a PN code string in synchronous timing with the vertical synch signal VD, and supplies the generated PN code string to multiplier 141.

Multiplier 141 carries out spectrum de-spreading by multiplying the video signal component S15 by the PN code string received from PN code generator 143, thus detecting the copy control information string embedded in the video signal component S15. The detected copy control information string is supplied to code determining unit 144. Code determining unit 144 determines copy control procedures from the supplied copy control information string, and then supplies the determination result to reproduction permission/prohibition controller 15. The copy control information string obtained through the spectrum de-spreading has the same copy control information as prior to the performance of the spectrum spreading process. Code determining unit 144 detects whether copying is always prohibited, one copy is allowed, no more copies are allowed, or copying is allowed freely. The detection result is then supplied, as a detection output S16, to reproduction permission/prohibition controller 15.

As described above with reference to FIG. 1, the detection output S14 indicating whether the video signal component is in the encrypted (or not-encrypted) state is also supplied from encrypted or not-encrypted state detector 12 to reproduction permission/prohibition controller 15. Based on the detection output S14 from encrypted or not-encrypted state detector 12 and the detection output S16 from copy control information detector 14, as described above, reproduction permission/prohibition controller 15 determines whether the video signal component S15 that is to be reproduced was illegally copied, and if so, then controls reproduction processing unit 16 not to reproduce the video signal component S15.

FIG. 6 is a table depicting combinations between encryption or not-encryption of the video signal component to be reproduced and the SS copy control information. In FIG. 6, a crossed mark X indicates a combination between encryption (or not-encryption) of the video signal component to be reproduced and the copy control information that should not occur in normal use, while a white circle O indicates a condition where the combination therebetween possibly occurs in normal use.

Video signals legally recorded on discs have SS copy control information (electronic watermark information) embedded therein. The video signals for which any copying is always prohibited are also encrypted. As shown in FIG. 6, therefore, when the video signal component to be reproduced is encrypted, copying of the video signals is prohibited. Hence, if the SS copy control information embedded in the video signal is in states other than the copy prohibited (Never Copy) state, the video signal was illegally copied or the copy control information has been tampered with. Accordingly, as shown FIG. 6, when the video signal component is encrypted and has the copy control information embedded therein is in the copy prohibited (Never Copy) state, that video signal component is determined to be in a normal condition. Reproduction permission/prohibition controller 15 then controls reproduction processing unit 16 to reproduce the video signals. The reproduced video signals are supplied to a monitor receiver or the like via output terminal 17.

On the contrary, if the copy control information indicates that only one copy is allowed, (One Copy), no more copies are allowed, (No More Copy) or all copies are allowed (Copy Free), and the video signal component is encrypted, the video signals were illegally copied and the SS copy control information was tampered with. Reproduction permission/prohibition controller 15 then controls reproduction processing unit 16 not to reproduce the recorded video signals. Thus, reproduction of the video signals is prohibited. As is also shown, the (No More Copy) State may alternatively also be an allowable state, depending upon whether the information is encrypted after one copy has been made in the one copy state, and the SS copy control information has been changed to the no more copy state.

For video signals that are not encrypted, copying of the video signals is not prohibited. As shown in FIG. 6, the non-encrypted video signals are normal signals if the copy control information allows for one copy (One Copy), allows no additional copies, (No More Copy), or allows all copies (Copy Free). If the copy control information is in the copy prohibited (Never Copy) state, the video signal was illegally decrypted, or the SS copy control information was tampered with, the video signals were illegally copied, and the video signals are not reproduced by reproduction processing unit 16.

The reason why the case where the video signals are not encrypted and are embedded with the SS copy control information therein representing the more-copy prohibited (No More Copy) state is regarded as a normal condition will now be described. The video signals, which are not encrypted and are embedded with the SS copy control information representing the only-one-generation copy allowed (One Copy) state, may occur during normal use. Then, when the video signals are copied, the SS copy control information representing the only-one-generation copy allowed (One Copy) state is rewritten to the more-copy prohibited (No More Copy) state.

Therefore, the video signals, which are not encrypted and have the SS copy control information representing the no-more-copy allowed (No more Copy) state embedded therein, may occur in normal use. Thus, the video signals are determined to be in a normal condition. Accordingly, as shown FIG. 6, when the video signal component is not encrypted and has the SS copy control information representing the only-one-generation copy allowed (One Copy) state, the more-copy prohibited (No More Copy) state, or the copy allowed (Copy Free) state embedded therein, that video signal component is determined to be in a normal condition. The reproduction permission/prohibition controller 15 then controls the reproduction processing unit 16 to reproduce and output the video signals. Of course, it would also be possible to encrypt the video signal upon changing the copy state to the (No More Copy) state.

When it is determined that the video signals to be reproduced were illegally copied, reproduction of the video signals may be restricted in various ways, rather than being completely prohibited. For example, the video signals may be reproduced while displaying along with the reproduced image an attention message informing users of that the reproduced video signals were illegally copied. Alternatively, a part of the reproduced image may be blanked so that users cannot see the whole of the reproduced image in a normal condition.

In the above-described embodiments, the CGMS copy control information is added to video signals recorded on legally produced discs, or the SS copy control information (the electronic watermark information) is embedded therein. For the purpose of further protecting against illegal copying of video signals, however, plural kinds of copy control information may be recorded on discs along with the video signals in a combined manner.

In one example, the CGMS copy control information is added to video signals, the electronic watermark information is embedded in the video signals, and the video signals for which all copying is to be prohibited are subjected to the encryption process. By so adding plural kinds of copy control information to video signals which are recorded on legally produced discs, it can be more accurately determined whether the video signals to be reproduced were illegally copied based on combinations among encryption or not-encryption of the video signals and the plural kinds of copy control information. Reproduction restriction control can thus be more reliably performed. This alternative embodiment will now be described where video signals legally recorded on discs have CGMS copy control information added to them and also have the SS copy control information embedded therein, and video signals for which any copying is always prohibited are CSS encrypted.

The state of the SS and CGMS copy control information correspond as follows. The SS copy prohibited (Never Copy) state corresponds to the (1, 1) state of the CGMS copy control information, the SS only-one-generation copy allowed (One Copy) state corresponds to the (1, 0) state of the CGMS copy control information, and the SS copy allowed (Copy Free) state corresponds to the (0, 0) state of the CGMS copy control information. The SS more-copy prohibited (No More Copy) state also corresponds to the (1, 1) state of the CGMS copy control information.

Next, a reproducing apparatus 30 of this additional embodiment for reproducing only the video signals recorded on discs that were legally produced, and include both the CGMS copy control information and the SS copy control information, and are encrypted as necessary will now be described. As shown in FIG. 7, reproducing apparatus 30 of this additional embodiment comprises a reader 31 for reading video signals, an encrypted or not-encrypted state detector 32, a decryption unit 33, a first copy control information detector 34, a second copy control information detector 35, a reproduction permission/prohibition controller 36, a reproduction processing unit 37, and an output terminal 17 for output of reproduced video signals. Reproducing apparatus 30 of this additional embodiment is constructed by components corresponding to the above-described reproducing apparatus 10 of the first embodiment, except that reproducing apparatus 30 includes two copy control information detectors, i.e., first copy control information detector 34 and second copy control information detector 35. First copy control information detector 34 detects the CGMS copy control information, and second copy control information detector 35 detects the SS copy control information. Accordingly, second copy control information detector 35 is constructed similarly to the copy control information detector for detecting the SS copy control information described above in FIG. 5.

As with reproducing apparatus 10 of the first embodiment described above, reader 31 forms digital reproduced signals S32 from signals S31 generated from reproducing information recorded on a recording medium 100. The digital reproduced signals S32 are then supplied to encrypted or not-encrypted state detector 32. The digital reproduced signals S32 include, in addition to a video signal component, flag information indicating whether the video signal component is encrypted, and cryptographic information such as the block key data and the title key used for encrypting the video signal.

Encrypted or not-encrypted state detector 32 supplies the digital reproduced signals S32, as digital reproduced signals S33, to decryption unit 33. Encrypted or not-encrypted state detector 32 detects the flag information indicating whether the associated video signal component, is encrypted. A detection output S34 is supplied to decryption unit 33 and to reproduction permission/prohibition controller 36.

Based on the detection output S34 supplied from encrypted or not-encrypted state detector 32, decryption unit 33 determines whether the video signal component contained in the digital reproduced signal S34 is encrypted. When it is determined that the video signal component contained in the digital reproduced signals S33 is encrypted, decryption unit 33 decrypts the encrypted video signal component by using the master key data stored in decryption unit 33 beforehand and the disc key data and the title key data both contained in the digital reproduced signals S33. A decrypted video signal component S35 is supplied to first copy control information detector 34, second copy control information detector 35 and reproduction processing unit 37. If it is determined that the video signal component contained in the digital reproduced signals S33 is not encrypted, decryption unit 33 extracts the video signal component from the digital reproduced signals S33, and supplies the extracted video signal component S35 to first copy control information detector 34, second copy control information detector 35 and reproduction processing unit 37.

First copy control information detector 34 detects two-bit CGMS copy control information added to the video signal component S35, and supplies a detection output S36 to the reproduction permission/prohibition controller 36. Second copy control information detector 35 detects SS copy control information embedded in the video signal component S35 in a manner similar to that described above in FIG. 5. After determining the contents of the detected SS copy control information, detector 35 supplies a detection output S37 to reproduction permission/prohibition controller 36. Based on the detection output S34 from encrypted or not-encrypted state detector 32, the detection output S36 from first copy control information detector 34, and the detection output S37 from second copy control information detector 35, reproduction permission/prohibition controller 36 produces a control signal S38 and then supplies this control signal to reproduction processing unit 37, thereby controlling reproduction processing unit 37.

When the combination of encryption (or not-encryption) of the video signal and the respective contents of the two kinds of copy control information is one of the combinations which should not occur in normal use, reproduction permission/prohibition controller 36 determines that the video signal component has been illegally copied, and the associated video signal component is not reproduced. FIGS. 8A and 8B each show a table depicting combinations between the CGMS copy control information and the SS copy control information depending on encryption (or not-encryption) of the video signal component to be reproduced. In FIG. 8A the video signals are encrypted, while in FIG. 8B the video signals are not encrypted. In FIGS. 8A and 8B, a crossed mark X indicates a condition where the combination of encryption (or not-encryption) of the video signal component to be reproduced and the respective CGMS and SS copy control information should not occur in normal use. A white circle O indicates a condition where the combination among the encryption status and various copy control information possibly occurs in normal use.

As mentioned above, video signals legally recorded on discs have the CGMS copy control information added thereto and the SS copy control information (the electronic watermark information) embedded therein. The video signals for which any copying is to be prohibited are also encrypted. As shown in FIG. 8A, therefore, when the video signal component to be reproduced is encrypted, this means that copying of the video signals is prohibited. Hence any video signal component including CGMS copy control information in other than the copy prohibited (1, 1) state and having SS copy control information in other than the copy prohibited (Never Copy) state or the (No More Copy) state embedded therein, depending on whether the information can be encrypted after one legal copy is made, was illegally copied or the CGMS copy control information or the SS copy control information was tampered with. Accordingly, as shown FIG. 8A, when the video signal component is encrypted, has the CGMS copy control information representing the copy prohibited (1, 1) state added thereto, and has the SS copy control information representing the copy prohibited (Never Copy) state is embedded therein, that video signal component is determined to be in a normal condition. Reproduction permission/prohibition controller 36 then controls reproduction processing unit 37 to reproduce the video signals. The reproduced video signals are supplied to a monitor receiver or the like via the output terminal 38.

On the contrary, when the CGMS copy control information is not in the copy prohibited (1, 1) state and the SS copy control information is not in the copy prohibited (Never Copy) state although the video signal component is encrypted, it is determined that the video signals were illegally copied. Reproduction permission/prohibition controller 36 then controls reproduction processing unit 37 to not reproduce the video signals.

Also, for video signals that are not encrypted, copying of the video signals is not prohibited. As shown in FIG. 8B, therefore, three combinations represent a condition possibly occurring in normal use. If the CGMS copy control information is in the only-one-generation copy allowed (1, 0) state and the SS copy control information is in the only-one-generation copy allowed (One Copy) state, this combination is determined to imply a normal condition. If the CGMS copy control information is in the copy prohibited (1, 1) state, and the SS copy control information is in the more-copy prohibited (No More Copy) state, this combination is determined to imply a normal condition. Alternatively, the data could be encrypted after changing from (1,0), one copy state to (1,1) no copy state. The charts shown in FIGS. 8A and 8B would be adjusted accordingly, as shown in FIG. 8A. Further, if the CGMS copy control information is in the copy allowed (0, 0) state and the SS copy control information is also in the copy allowed (Copy Free) state, this combination is determined to be a normal condition. Reproduction of the video signals is allowed.

If the detected combination is other than the above combinations, the video signals were illegally decrypted, or either or both of the CGMS copy control information and the SS copy control information were tampered with. Reproduction of the video signals is not allowed.

In this additional embodiment, after video signals in the only-one-generation copy allowed state are copied, the CGMS copy control information is rewritten into the copy prohibited (1, 1) state and the SS copy control information is rewritten in the more-copy prohibited (No More Copy)

state. This combination is allowed, as noted in FIG. 8B. Alternatively, upon rewriting of the copy protection information, the data could be encrypted. Thus, a "0" would be added to FIG. 8A between these two states, as shown.

Also in this additional embodiment, because the CGMS copy control information (0, 1) is not employed at the present, the reproducing apparatus may be designed, by way of example, such that if the CGMS copy control information is in the (0, 1) state, reproduction of the video signals is prohibited because the copy control information was tampered with.

When it is determined that the video signals to be reproduced were illegally copied, reproduction of the video signals may be restricted rather than only prohibited as with the embodiments described above. As with the above prior embodiment, because the reproduction restricting control prohibits reproduction of the illegally copied video signals or prevents an image of those video signals from being reproduced in a normal condition, illegal copying of the video signals can be prevented. Further, users know that the video signals were illegally copied. The users will likely raise complaints against the dealers who have marketed the recording media on which the video signals incapable of being reproduced in a normal way are recorded. This makes it easier to keep control over dealers who are marketing the recording media on which video signals are illegally recorded.

Additionally, while embodiments may allow one copy as shown in FIG. 8B, this may be not preferable for ROM discs such as DVDs because most of information signals recorded on ROM discs and marketed are protected by copyright. Thus, the allowing of one copy may not be employed. When video signals to be reproduced are not encrypted and the copy control information is in the only-one-generation copy allowed state or the more-copy prohibited state, reproduction of those video signals can be prohibited.

While this additional embodiment has been described as adding the CGMS copy control information and the SS copy control information to video signals, the copy control information is not limited thereto. Any other suitable copy control information may be added to video signals. In this case, a copy control information detector for detecting the other copy control information added to video signals is provided.

The number of kinds of copy control information added to video signals is similarly not limited two, but may be increased to three, four or more. Copy control information detectors capable of detecting the added copy control information are provided in one-to-one relation to the different types of copy control information. Then, combinations among encryption or not-encryption of video signals and the respective copy control information are defined, similarly to the charts of FIG. 8, such that the combinations that should not occur in normal use, and the combinations that possibly occur in normal use are defined. Reproduction permission/prohibition controller 36 is modified correspondingly to perform control based on those combinations.

While the above embodiments have been described as applying the CSS encryption process to the video signals which are to be prohibited from being copied, any other suitable type of encryption process is of course also usable.

Figure 9:
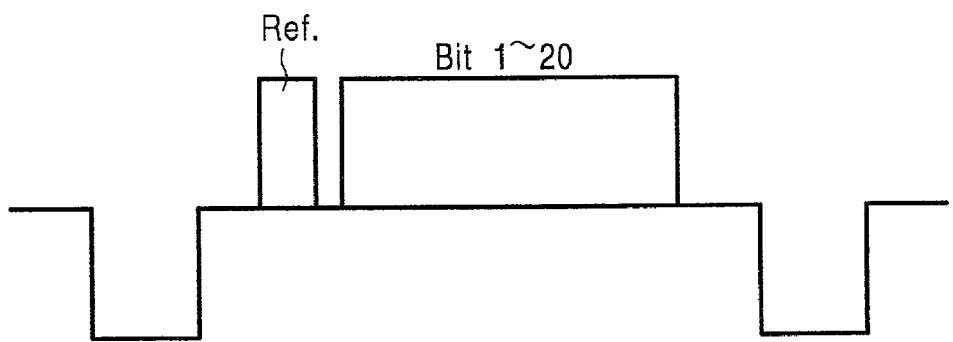
FIG. 9 represents CGMS copy control information added to analog video signals.
Figure 10:
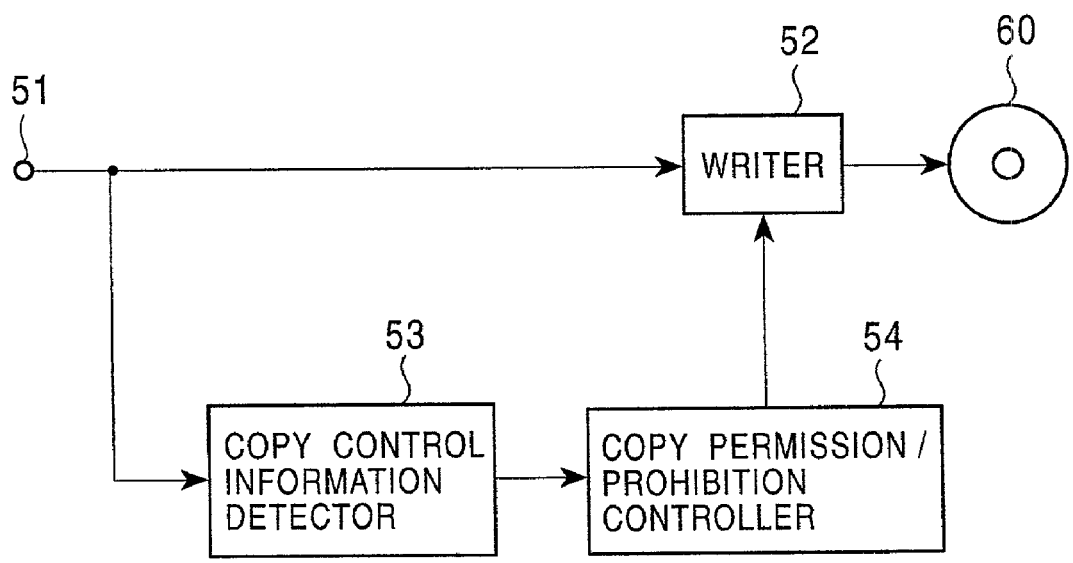
FIG. 10 is a block diagram depicting a prior art recording apparatus using copy control information.

Also, while the above embodiments have been described as handling digital video signals, analog signals may also be handled. In the case of analog video signals, the CGMS copy control information is added to the twentieth horizontal zone within a vertical blanking period, for example, as shown in FIG. 9. Further, the electronic watermark information can be embedded in the analog video signals. Accordingly, the reproduction restriction control can be performed on analog video signals by detecting the CGSM copy control information and/or the electronic watermark information added to the analog video signals, and then detecting whether the analog video signals are encrypted.

While in the above embodiments the SS copy control information, resulting from applying spectrum spreading to the copy control information, is employed as electronic watermark information, the electronic watermark information is not limited to the SS copy control information. Any other suitable electronic watermark information formed by various types of electronic watermark processing can be embedded in video signals. These may include for example, embedding additive information on the least significant bit or the next least significant bit of a multiple-bit digital video signal representing each pixel. In such a case, depending on the electronic watermark processing employed, a copy control information detector capable of detecting the corresponding electronic watermark information is provided in a reproducing apparatus.

While the above embodiments have been described, in connection with the reproducing apparatus for reproducing video signals recorded on DVDs (Digital Video Discs), recording media are not limited to DVDs. The present invention is also applicable to other reproducing apparatus for reproducing information signals recorded on a variety of magnetic discs and magneto-optical discs, such as VTRs (Video Tape Recorders), HD (Hard Disc) units, and MD (Mini Disc) units. Accordingly, information signals to be subjected to the reproduction restricting control are not limited to video signals. The invention is further applicable to reproducing apparatus for reproducing various information signals, such as voice signals, computer programs, and other data.

Moreover, the above embodiments have been described, by way of example, in connection with the reproducing apparatus for reproducing information signals from recording media. However, the present invention is also applicable to an information signal outputting apparatus such as a PC (Personal Computer) that receives information signals via a network, e.g., Internet, and outputs the received information signals to a monitor receiver or a recording apparatus. It is further applicable to various receivers for receiving broadcasting waves to obtain information signals and outputting the obtained information signals to a monitor receiver or a recording apparatus. Such an information signal outputting apparatus can be constructed basically similarly to the reproducing apparatus shown in FIGS. 1 and 7 except that the readers for reading data from recording media are not provided as compared with reproducing apparatus 10 and 30 shown in FIGS. 1 and 7. Specifically, the information signal outputting apparatus is constructed so as to receive information signals supplied via a network, to determine whether the received information signals are encrypted, and to detect copy control information added to the received information signals. Then, output control of the information signals is performed based on combinations between encryption or not-encryption of the received information signals and the contents of copy control represented by the detected copy control information.

When it is determined that the information signals supplied to the information signal outputting apparatus were illegally copied, output of the information signals can be prohibited or inhibited to disable normal use of the output signals.

If there are plural kinds of information signals to be reproduced or output, such as video signals and voice signals, the reproduction restricting control or the output restricting control of the information signals can be performed by detecting whether each of the information signals are encrypted, detecting copy control information added to each kind of the information signals, and executing the control based on combinations between encryption or not-encryption of the information signals and the contents of copy control represented by the detected copy control information.

Furthermore, when embedding electronic watermark information on video signals, it is difficult to rewrite the electronic watermark information from the only-one-generation copy allowed (One Copy) state to the more-copy prohibited (No More Copy) state. For this reason, additional information representing the only-one-generation copy allowed (One Copy) state may be added to a vertical blanking period of the video signals or the like to allow for the single copy, and the addition information may be removed when the video signals are copied, thus resulting in a restricted state. Thus a combination between the electronic watermark information and other information may be used for copy control.

Also, the combinations between encryption or not-encryption of the information signals and copy control information are selected and applied in accordance with the category of each target apparatus, such as either a reproducing apparatus or a recording apparatus, the specific encryption conditions, whether there has been a change in definition of the copy control information, and where the copy control information is detected. This point can be flexibly dealt with by modifying control programs executed in a controller to control the reproduction processing unit or the output processing unit in the reproducing apparatus or the recording apparatus, e.g., the reproduction permission/prohibition controller, and data for use in the control programs.

As will be apparent from the above description, according to the first aspect of the invention, the following advantages are obtained. If information signals are illegally copied with illegal decryption of the encrypted information signals or tampering with the copy control information, the combination between encryption (or not-encryption) of the information signals and the copy control information becomes one of the combinations which should not occur in normal use. When such a combination is detected, reproduction of the information signals can be restricted upon determining that the information signals were illegally copied.

Also, because reproduction of the information signals is itself restricted, illegal copying of the information signals can be prevented from being repeated. Further, restricting reproduction of the information signals enables users themselves to be informed of that the information signals were illegally copied. The users who attempted to utilize the information signals which are restricted because of being illegally copied can raise complaints against dealers who supplied the illegally copied information signals. This makes it possible to more easily control the dealers who are supplying illegally recorded information signals. As a result, illegal copying of information signals can be prevented.

Based on combinations between encryption (or not-encryption) of the information signals and the respective contents of copy control represented by plural kinds of copy control information, it is possible to reliably determine whether the information signals to be reproduced were illegally copied. Therefore, reproduction of the information signals can be restricted surely and properly.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An information signal outputting method for receiving a supplied information signal copy control information added thereto, and outputting said information signal, comprising:

detecting whether said information signal is encrypted or not-encrypted by a plurality of the encryption key data and producing an output representative thereof;

detecting said copy control information from said information signal and producing an output representative thereof, said copy control information comprising electronic watermark information embedded in said information signal;

restricting output of said information signal when a combination of the outputs of said detection of whether said signal is encrypted or not-encrypted and the detection of said copy control information results in a combination that should not occur in normal use; and notifying a user that the information signal has been illegally copied when said control means restricts reproduction, modifying access to said information signal to allow reproduction of said information signal while simultaneously displaying an informative message to the user or to allow reproduction of said information signal while blanking a part of the reproduced signal.

2. The information signal outputting method according to claim 1, wherein said information signal has a plurality of different kinds of copy control information added thereto, and reproduction of said information signal is selectively restricted based on whether said signal is encrypted or not-encrypted and the states of said plurality of different kinds of copy control information.

3. An information signal outputting apparatus for receiving a supplied information signal having copy control information added thereto, and outputting said information signal, comprising:

first detecting means for detecting whether said information signal is encrypted or not-encrypted by a plurality of the encryption key data and producing an output representative thereof;

second detecting means for detecting said copy control information from said information signal and producing an output representative thereof, said copy control information comprising electronic watermark information embedded in said information signal, said second detecting means detecting said electronic watermark information;

control means for restricting output of said information signal when a combination of the output of said first detecting means and the output of said second detecting means results in a combination that should not occur in normal use; and notifying means for notifying a user that the information signal has been illegally copied when said control means restricts reproduction, means for modifying access to said information signal to allow reproduction of said information signal while simultaneously displaying an informative message to the user or to allow reproduction of said information signal while blanking a part of the reproduced signal.

4. The information signal outputting apparatus according to claim 3, wherein said information signal has a plurality of different kinds of copy control information added thereto, said information signal outputting apparatus including a plurality of second detecting means for detecting each of said corresponding plural different kinds of copy control information, each producing an output representative thereof; and said control means selectively restricting output of said information signal based on the outputs of said first detecting means and said plurality of second detecting means.

5. An information signal reproducing method for reproducing an information signal from a recording medium on which said information signal, including added copy control information is recorded, comprising:

detecting whether said information signal read out from said recording medium is encrypted or not-encrypted by a plurality of the encryption key data from said recording medium and producing an output representative thereof;

detecting said copy control information from said information signal read out from said recording medium and producing an output representative thereof, said copy control information comprising electronic watermark information embedded in said information signal;

restricting reproduction of said information signal when a combination of the outputs of said detection of whether said information signal is encrypted or not encrypted and said detection of said copy control information results in a combination that should not occur in normal use; and notifying a user that the information signal has been illegally copied when said control means restricts reproduction, modifying access to said information signal to allow reproduction of said information signal while simultaneously displaying an informative message to the user or to allow reproduction of said information signal while blanking a part of the reproduced signal.

6. The information signal reproducing method of claim 5, wherein copy control information in accordance with the copy generation management system (CGMS) is added to said information signal as said copy control information; and said copy control information is detected in accordance with the copy generation management system (CGMS).

7. The information signal reproducing method of claim 5, wherein said electronic watermark information has been subject to spectrum spreading.

8. The information signal reproducing method of claim 5, wherein said electronic watermark information represents one of four states, all copies are prohibited, only one copy is allowed, no more copies are allowed, or copies are allowed freely.

9. The information signal reproducing method of claim 5, wherein said information signal is encrypted in accordance with the contents scramble system (CSS), and whether said information signal is encrypted is detected in accordance with the contents scramble system (CSS).

10. The information signal reproducing method of claim 5, wherein a plurality of different kinds of copy control information are added to said information signal, and reproduction of said information signal is selectively restricted based on whether said information signal is encrypted, and the states of said plurality of different kinds of copy control information.

11. The information signal reproducing method of claim 10, wherein said information signal is encrypted in accordance with the contents scramble system (CSS), and said plurality of different kinds of copy control information includes generation management system (CGMS), and electronic watermark information.

12. The information signal reproducing method of claim 11, wherein said electronic watermark information has been subjected to spectrum spreading.

13. The information signal reproducing method of claim 5, wherein when it is detected that said information signal is encrypted, and when it is detected that said copy control information indicates that no copies are permitted, reproduction of said information signal is permitted.

14. An information signal reproducing apparatus for reproducing an information signal from a recording medium on which said information signal, including added copy control information is recorded, comprising:

first detecting means for detecting whether said information signal read out from said recording medium is encrypted or not-encrypted by a plurality of the encryption key data from said recording medium and producing an output representative thereof;

second detecting means for detecting said copy control information from said information signal read out from said recording medium and producing an output representative thereof, said copy control information comprising electronic watermark information embedded in said information signal, said second detecting means detecting said electronic watermark information;

control means for restricting reproduction of said information signal when a combination of the output of said first detecting means and the output of said second detecting means results in a combination that should not occur in normal use; and notifying means for notifying a user that the information signal has been illegally copied when said control means restricts reproduction, modifying means for modifying access to said information signal to allow reproduction of said information signal while simultaneously displaying an informative message to the user or to allow reproduction of said information signal while blanking a part of the reproduced signal.

15. The information signal reproducing apparatus of claim 1, wherein said copy control information added to said information signal comprises copy control information in accordance with the copy generation management system (CGMS), said second detecting means detects said copy control information in accordance with the copy generation management system (CGMS).

16. The information signal reproducing apparatus of claim 1, wherein said electronic watermark information has been subject to spectrum spreading.

17. The information signal reproducing apparatus of claim 1, wherein said electronic watermark information represents one of four states, all copies are prohibited, only one copy is allowed, no more copies are allowed, or copies are allowed freely.

18. The information signal reproducing apparatus of claim 1, wherein when said information signal is encrypted, it is encrypted in accordance with the contents scramble system (CSS); and said first detecting means detects whether said information signal is encrypted in accordance with the contents scramble system (CSS).

19. The information signal reproducing apparatus of claim 1, wherein a plurality of different kinds of copy control information are added to said information signal, said information signal reproducing apparatus further comprising:

a plurality of second detecting means for detecting each of said corresponding plurality of different kinds of copy control information, each producing an output representative thereof; and wherein said control means selectively restricts reproduction of said information signal based on the detection output of said first detecting means and the respective detection outputs of said plurality of second detecting means.

20. The information signal reproducing apparatus of claim 19, wherein said information signal is encrypted in accordance with the contents scramble system (CSS), and said plurality of different kinds of copy control information include copy control information in accordance with the copy generation management system (CGMS) and electronic watermark information.

21. The information signal reproducing apparatus of claim 20, wherein said electronic watermark information has been subjected to spectrum spreading.

22. The information signal reproducing apparatus of claim 1, wherein when said first detecting means detects that said information signal is encrypted, and said second detecting means detects that said copy control information indicates that no copies are allowed, said control means permits reproduction of said information signal.

* * * * *